United States Patent [19]

Hines et al.

[11] Patent Number: 4,967,997

[45] Date of Patent: Nov. 6, 1990

[54] BUTTERFLY VALVE WITH INTRA-SHAFT ACTUATOR MEANS

[75] Inventors: Marshall U. Hines, Scottsdale; Larry K. Ball, Chandler, both of Ariz.

[73] Assignee: Allied-Signal Inc., Morris Township, Morris County, N.J.

[21] Appl. No.: 426,921

[22] Filed: Oct. 24, 1989

[51] Int. Cl.$^5$ .............................................. F16K 1/22
[52] U.S. Cl. ........................................ 251/56; 251/58; 251/258; 251/308
[58] Field of Search ................... 251/56, 58, 258, 263, 251/305, 308

[56] References Cited

U.S. PATENT DOCUMENTS

| | | |
|---|---|---|
| 212,556 | 2/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Hart . |
| 1,541,047 | 6/1925 | Hart . |
| 1,744,798 | 1/1930 | Price . |
| 2,051,881 | 8/1936 | Mock . |
| 2,095,263 | 10/1937 | Moss . |
| 2,271,390 | 1/1942 | Dodson . |
| 2,796,082 | 6/1957 | Green et al. . |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg . |
| 3,200,838 | 8/1965 | Sheaffer . |
| 3,298,659 | 1/1967 | Cupedo ............................ 251/58 X |
| 3,344,808 | 10/1967 | Cary . |
| 3,400,907 | 9/1968 | Horn et al. . |
| 3,442,489 | 5/1969 | Cary et al. . |
| 3,516,640 | 9/1969 | Bryer et al. . |
| 3,545,486 | 12/1970 | Larson . |
| 3,675,681 | 7/1972 | Obermaier . |
| 3,677,297 | 7/1972 | Walton . |
| 3,794,288 | 2/1974 | Dolder et al. . |
| 3,960,177 | 6/1976 | Baumann . |
| 3,971,414 | 7/1976 | Illing . |
| 3,982,725 | 9/1976 | Clark . |
| 3,993,096 | 11/1976 | Wilson . |
| 4,084,617 | 4/1978 | Happe . |
| 4,190,074 | 2/1980 | Mailliet et al. . |
| 4,313,592 | 2/1982 | Baas .. |
| 4,367,861 | 1/1983 | Bray et al. . |
| 4,508,132 | 4/1985 | Mayfield et al. . |
| 4,534,538 | 8/1985 | Buckley et al. . |
| 4,556,192 | 12/1985 | Ramisch . |
| 4,586,693 | 5/1986 | Tinner ................................. 251/56 |
| 4,706,706 | 11/1987 | Page et al. . |
| 4,712,768 | 12/1987 | Herr et al. . |

FOREIGN PATENT DOCUMENTS 1533073 11/1978 United Kingdom .

OTHER PUBLICATIONS

"Fishtail vs. Conventional Discs in Butterfly Valves"; Carl D. Wilson, Instruments & Control Systems/vol. 41, Mar. 1968.

"A Note on the Reduction of the Fluid-Dynamic Torque of Butterfly Valves", D. W. Bryer and D. E. Walshe, National Physical Laboratory, Aerodynamics Division undated.

Primary Examiner—Robert G. Nilson
Attorney, Agent, or Firm—Joseph R. Black; James W. McFarland; Robert A. Walsh

[57] ABSTRACT

A butterfly valve (30) is described in which the plate member (32) is in facing relationship with a hollow shaft (34) and is moved by pistons (50, 52) disposed in the shaft. The pistons (50, 52) are mechanically coupled to the plate member (32) by cam followers (58, 60) which ride along cams (40, 42, 46, 48) formed in the shaft (34) and plate member. The plate member (32) is capable of both revolutionary and translation movement relative to the longitudinal axis of the shaft (34) toward the end of minimizing the externally supplied energy required to operate the valve (30). The pistons (50, 52) collectively have a center of mass that coincides with the center of the duct (68) toward the end of minimizing vibrational effects.

15 Claims, 2 Drawing Sheets

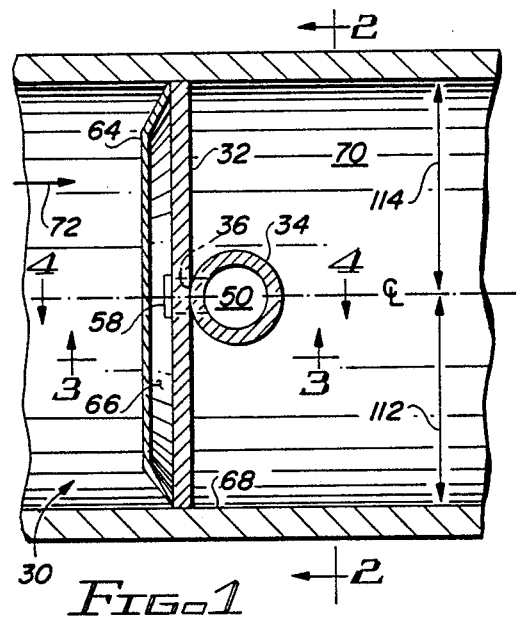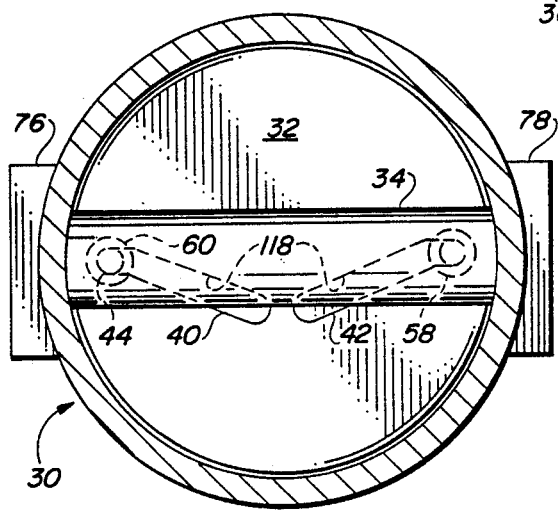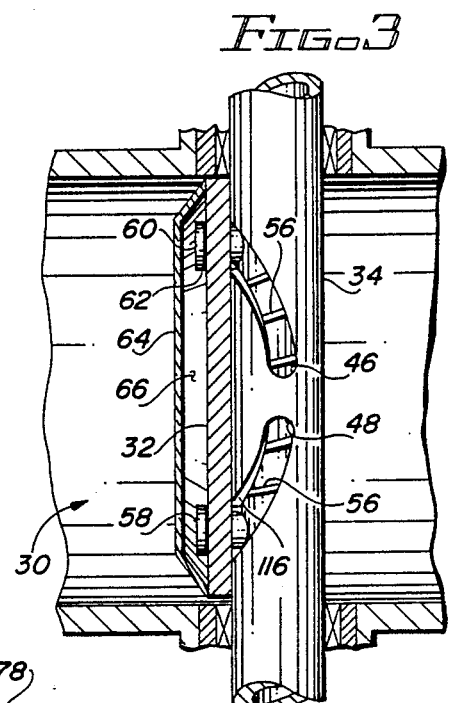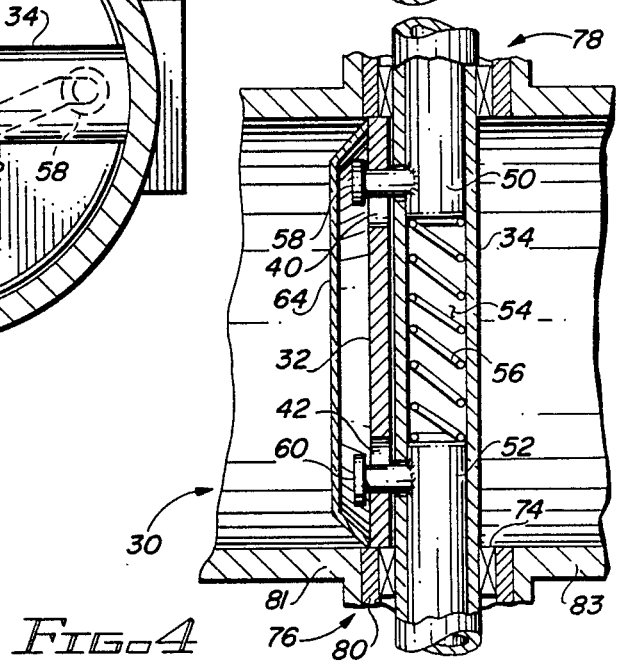

BUTTERFLY VALVE WITH INTRA-SHAFT ACTUATOR MEANS

Reference is made to U.S. patent applications Ser. No. 374,897 which was filed on June 30, 1989, and Ser. No. 395,234 which was filed on Aug. 17, 1989. This and the referenced applications are copending and assigned to a common assignee.

TECHNICAL FIELD

The present invention relates generally to butterfly valves. More specifically, the invention relates to butterfly valves which incorporate novel means for moving or retaining the position of a butterfly plate subjected to aerodynamic or hydrodynamic forces which tend to resist such movement or retention.

BACKGROUND OF THE INVENTION

FIG. 7 of the accompanying drawings schematically illustrates a conventional butterfly valve structure 10 in which a butterfly plate 12 positioned in a duct 14 is rotated about an axis 16 defined by a spindle or shaft 18 in order to vary the rate at which fluid flows through the duct. Typically, the plate 12 is rotated via torque applied by an external actuator 20 through the shaft 18.

A series of arrows 22 generally illustrates the static pressure profile resulting from the hydrodynamic forces acting on the butterfly plate 12. The overall effect of the static pressure may be represented by a center of pressure (indicated by the dashed arrow 24) which tends to force the plate 12 to the closed position. This force must be countered or overcome by energy supplied to the actuator 20 in order to retain the position of the plate 12 or further open the valve 10.

As a general matter, in order to lower the externally-supplied energy required to match or exceed the hydrodynamic forces acting on the plate 12, the center of pressure 24 should be favorably altered in relation to the axis of rotation 16. That is, either the center of pressure 24 should be aligned with or moved closer to the shaft 18, or the shaft should be aligned with or moved closer to the center of pressure. Given a particular rotational position of the plate 12 within the duct 14, the center of pressure 24 can be moved in the manner disclosed in U.S. Pat. No. 3,971,414 Illing, for example, by angling a portion of the plate 12 to partially compensate for excessive hydrodynamic forces otherwise acting on the plate at that position. However, this partial compensation is achieved at the expense of splitting the plate 12. This creates problems in applications which demand sealing engagement of the plate 12 with the duct 14 when the valve 10 is closed, and still requires the use of an external actuator 20 to torque the shaft 18.

Butterfly valve structures 10 are in some environments subjected to considerable vibration which can adversely effect both performance and longevity. Vibrational effects are aggravated to the degree that the center of mass of the structure 10 is distanced from the center of the duct 14. Such distancing is the typical state of affairs when a single external actuator 20 is used to torque the shaft 18.

If a butterfly valve structure 10 were designed such that the plate 12 could be translated (rather than simply rotated) relative to the shaft 18, then it would be possible to align or more closely align the center of pressure 24 with the axis 16, thus eliminating or minimizing the externally-supplied energy required to maintain a given flow rate. Furthermore, if the center of mass of the actuator 20 more closely coincided with the center of the duct 14, then the forementioned vibrational effects would be minimized. Accordingly, the present invention is directed to the objective of providing a butterfly valve that is more energy-efficient than conventional butterfly valves. An additional objective of the invention is to provide a structurally stable butterfly valve that is less sensitive to vibration than conventional butterfly valves.

SUMMARY OF THE INVENTION

This invention achieves the forementioned objectives by providing a butterfly valve that comprises a hollow shaft, a plate-like valve member in facing relationship with the shaft, and actuator means, at least partially disposed within the shaft and mechanically coupled to the valve member through the shaft, for effecting revolutionary and translational movement of the valve member relative to the longitudinal axis of the shaft in response to externally-supplied energy.

Preferably, the actuator means comprises two spaced-apart pistons slidably disposed in the hollow shaft, and a cam arrangement is employed to convert linear movement of the pistons to revolutionary and/or translational movement of the valve member relative to the longitudinal axis of the shaft.

BRIEF DESCRIPTION OF THE DRAWINGS

FIG. 1 is a generally cross-sectional view illustrating the preferred embodiment of the invention.

FIG. 2 is a generally elevational, partially cross-sectional view taken along line 2—2 of FIG. 1.

FIG. 3 is a partially elevational, partially cross-sectional, and slightly schematic view taken along line 3—3 of FIG. 1.

FIG. 4 is a generally cross-sectional and slightly schematic view taken along line 4—4 of FIG. 1.

DESCRIPTION OF THE PREFERRED EMBODIMENT

Figure 6:
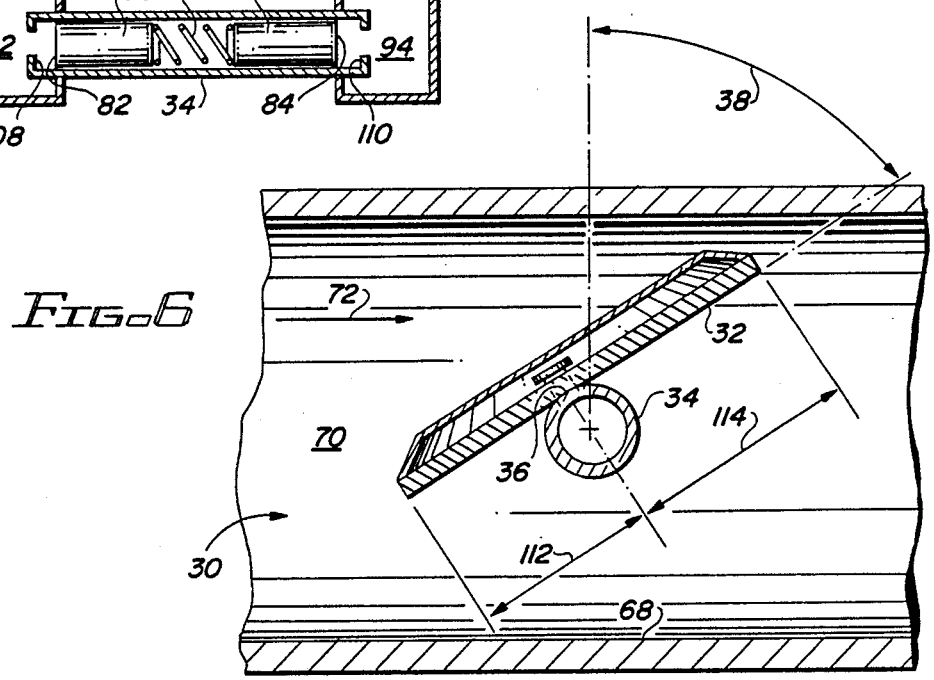
FIG. 6 corresponds in kind to FIG. 1 and is included to aid description.

FIGS. 1-4 illustrate a butterfly valve 30 in accordance with the preferred embodiment of the invention. In FIG. 1, a plate-like valve member 32 (hereinafter "plate") having a suitable rim seal (not shown) abuts the exterior surface of a hollow shaft 34. The abutment location 36 defines a pivot axis for the plate 32. As is further developed hereinafter, the abutment location 36 varies with the angle of rotation (indicated generally in FIG. 6 by the arrow 38) of the plate 32.

Viewing FIG. 2, two slots 40, 42 are formed through the plate 32. Each slot 40, 42 has a portion (as at 44) that is substantially parallel to the shaft 34 but continuous with the remainder of the slot. The remainder of the slot 40 is angled relative to the shaft. The slots 40, 42 converge toward a centerline (not shown) that bisects the plate 32 and is perpendicular to the shaft 34, and are symmetric with respect to the centerline.

Viewing FIG. 3, two arcuate slots 46, 48 are formed through the shaft 34 between its exterior and interior surfaces. The slots 46, 48 have substantially the same overall length as the slots 40, 42 (FIG. 2) formed in the plate 32 but are angularly convergent along their entire lengths. That is, portions of the slots 46, 48 that correspond to the parallel portions 44 (FIG. 2) are not parallel to the shaft 34. The general, positional relationship of the slots 46, 48 formed in the shaft 34 to the slots 40, 42 formed in the plate 32 can be understood by imagining the plate 32 as a piece of paper having the slots 40, 42 formed therein, wherein the parallel portions 44 are colinear with the remainder rather than parallel to the shaft 34. If the imaginary paper plate is then folded around the shaft 34, the slots 40, 42 will nominally locate the positions of the slots 46, 48 to be formed in the shaft 34.

Although not illustrated in the accompanying drawings, it may also be desirable to provide the shaft 34 with a centrally-disposed annular boss extending circumferentially around the shaft and engaging a third slot or recess formed in the plate 32. The third slot would extend linearly along the forementioned centerline. The purpose of the annular boss/third slot combination would be to minimize or eliminate binding as the cam followers 58, 60 ride along the non-parallel portions of the slots 40, 42 formed in the plate 32.

Viewing FIG. 4, two pistons 50, 52 are coaxial with the shaft and slidably disposed therein. The pistons 50, 52 are separated by a variable-length center chamber 54 in which a spring 56 is disposed. Two cam followers 58, 60 extend through the slots 46, 48, 40, 42 and are rigidly secured to the pistons 50, 52 by any suitable means. Annular flanges (as at 62 in FIG. 3) on the cam followers 58, 60 mechanically couple the plate 32 to the pistons 50, 52. The cam followers 58, 60 may be of any conventional construction suitable for the use described herein, and should employ bearings to eliminate friction otherwise encountered in moving along the slots 46, 48, 40, 42. An exemplary method of construction would be to provide a central cylindrical post, to provide a bearing surrounding all but an axially-extending end portion of the post, and to provide a generally cylindrical sleeve surrounding the bearing. The axially-extending end portion of the post would be press-fitted into a hole drilled in the piston, and the annular flange would be a larger-diameter integral portion of the post at the opposite end of the latter. A plate-like cover 64, suitably adapted to form a cavity 66 that accommodates movement of the cam followers 58, 60, is rigidly secured to the plate 32 in order to prevent flow through the slots 40, 42.

Referring to FIGS. 1, 2 and 4, the shaft 34 is supported across a duct 68 which defines a flow path 70, the direction of flow being indicated by the arrow 72. The shaft 34 is rotatable via bearings 74 positioned in duct bosses 76, 78. Typically, the shaft 34 is supported by a duct-member mounting body 80 to which upstream and downstream duct members 81, 83 are secured by suitable means to form the duct 68.

Figure 5:
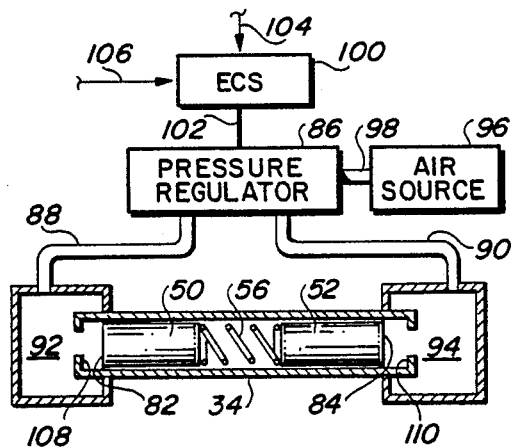
FIG. 5 is a schematic drawing generally illustrating control of movement for the pistons illustrated in FIG. 4.

Referring now to FIG. 5, the outward ends 82, 84 of the pistons 50, 52 are in fluid communication with a conventional pressure regulator 86 via separate conduits 88, 90 and separate pressure chambers 92, 94, the pressure chambers being formed in part by the shaft 34. The pressure regulator 86 is in fluid communication with a source 96 of pressurized air via a conduit 98, and in electrical communication with an electronic control system 100 via wires 102. In operation, the control system 100 receives electronic sensor data (indicated by arrow 104) from a remote sensor (not shown) positioned downstream from the plate 32, the sensor data being indicative of the flow rate in the duct 68. The control system 100 also receives electronic demand data (indicated by arrow 106) from a remote control device (not shown), the demand data being indicative of the required flow rate in the duct 68. In response to the sensor and demand data 104, 106, the control system 100 communicates control signals to the pressure regulator 86, which in response thereto equally regulates air pressure in the chambers 92, 94.

Referring now to FIGS. 1-6, annular stops 108, 110 (FIG. 5) rigidly secured to the ends of the shaft 34 define null positions for the pistons 50, 52. The null position is the position at which, for a given design, the angle of rotation 38 is at its minimum. This defines a reference position of the plate 32 relative to the shaft 34. If in a given design it is necessary to fully close the valve 30, then the minimum angle of rotation is zero, as exemplified by the preferred embodiment illustrated herein. When the valve 30 is in the closed position illustrated in FIGS. 1 and 2, the pistons 50, 52 are in their null positions and the air pressure in the chambers 92, 94 is insufficient to overcome the opposing force exerted on the pistons by the spring 56. At the same time, the shaft 34 is centered in relation to the plate 32 as indicated in FIGS. 1 and 2, and the cam followers 58, 60 occupy their outermost positions in the slots 40, 42, 46, 48 as indicated in FIGS. 2 and 3. By now it will be recognized that the slots 40, 42, 46, 48 define cams along which the followers 58, 60 ride during actuation of the valve 30.

Figure 7:
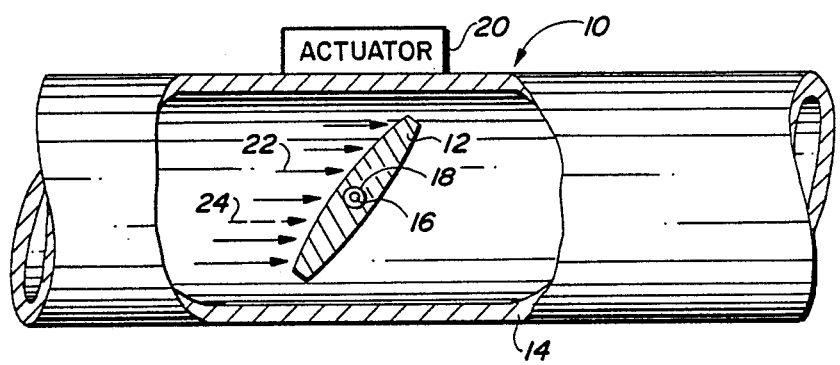
FIG. 7 is a generally schematic drawing of a conventional butterfly valve structure.

When it is desired to open the valve 30, the pressure in the chambers 92, 94 is increased to overcome the force exerted by the spring 56, and the pistons 50, 52, carrying the cam followers 58, 60, begin moving toward each other. As the cam followers 58, 60 ride along the parallel portions 44 of the slots 40, 42, they ride along associated convergent portions of the slots 46, 48 and thereby exert force on the wall 116 (FIG. 3) of the shaft 34. This causes the shaft 34 to rotate in a clockwise direction as determined by reference to FIG. 1 and, since rotation of the shaft transfers force to the walls 118 (FIG. 3) of the plate 32, causes the plate to rotate with the shaft to an open position, thereby effecting revolutionary movement of the plate relative to the longitudinal axis of the shaft. Once the plate 32 is in an open position, further pressurization of the chambers 92, 94 causes the cam followers 58, 60 to ride along the convergent, non-parallel portions of the slots 40, 42. The consequent force transferred to the walls 118 of the plate 32 results in translational movement of the plate relative to the longitudinal axis of the shaft 34. Thus, whereas the areas (indicated in a single dimension by arrows 112, 114) of the plate 32 on each side of the abutment location 36 are the same in FIG. 1, the one area 114 is greater than the other area 112 in FIG. 6. The possible range of translational movement associated with a given angle of rotation 38 is of course limited by the duct 68. However, the energy required to maintain a given angle of rotation 38 can be minimized by translating the plate 32 relative to the shaft 34 so that the center of pressure 24 (FIG. 7) acting on the former is as closely aligned with the abutment location 36 as possible, given the constraints imposed by the duct 68. Moreover, the limitations on translational movement imposed by the duct 68 can be minimized or eliminated by appropriately shaping the inside surfaces of the downstream duct member 83 and the mounting body 80.

In the illustrated embodiment parallel portions 44 of the slots 40, 42 are provided to enable initial opening of the valve 30. It will be recognized that in applications which demand a closing function, other arrangements for effecting initial opening are possible. For example, the valve 30 could be modified to provide a pilot valve or a displaceable shaft as disclosed in the above-referenced '897 application. However, it should also be recognized that the parallel portions 44, in cooperation with the cam followers 58, 60 and arcuate slots 46, 48, provide a means for rotating the combination of the shaft 34 and plate 32 in response to movement of the pistons 50, 52. Thus, if translational movement of the plate 32 relative to the shaft 34 is undesired in a particular application, the more conventional motion of simple rotation (differing from convention, however, in that the plate 32 undergoes revolutionary movement relative to the longitudinal axis of the shaft 34) can be provided by forming a single slot in the plate 32. The single slot would be parallel to the shaft 34 and sufficiently long to function as two separate cams for the followers 58, 60. Under that arrangement, although the advantages associated with translational movement are sacrificed, those associated with the positioning of actuators in the shaft are retained.

The reader should understand that the foregoing text and accompanying drawings are not intended to restrict the scope of the invention to specific details which are ancillary to the teaching contained herein. The invention should be construed as broadly as is consistent with the following claims and their equivalents.

What is claimed is:

1. A butterfly valve, comprising:
    a duct defining a flow path for fluid;
    a hollow shaft supported across said duct and extending across said flow path, said shaft defining a longitudinal axis;
    a plate-like valve member disposed in said flow path and cooperating with said shaft to define a pivot axis;
    actuator means for moving said valve member relative to said longitudinal axis in response to externally-supplied energy, said actuator means being at least in part disposed in said shaft and being interconnected with said valve member through said shaft so as to render said actuator means operable to effect translational movement of said valve member relative to said longitudinal axis whereby said butterfly valve is operable to alter torque applied about said pivot axis by said fluid and on said valve member.

2. The invention of claim 1 wherein said actuator means comprises two spaced-apart pistons coaxial with said longitudinal axis and slidable within said shaft.

3. The invention of claim 2 further comprising biasing means interposed between said pistons for urging said valve member toward a closed position relative to said shaft.

4. The invention of claim 2 wherein both said valve member and said shaft are adapted to form two separate cams, and further comprising two separate cam followers mechanically coupling said pistons to said valve member and being secured to separate ones of said pistons, said cam followers being movable along different pairs of said cams, said pairs each consisting of one of said cams formed by said valve member and one of said cams formed by said shaft, said cam followers being operable in response to axially-directed movement of said pistons to effect translational movement of said valve member relative to said longitudinal axis.

5. The invention of claim 4 wherein said cam followers are rigidly secured to said pistons.

6. The invention of claim 4 further comprising biasing means interposed between said pistons for urging said valve member toward a reference position relative to said shaft.

7. The invention of claim 6 wherein said shaft and said valve member are slotted to form said cams.

8. The invention of claim 7 wherein said cams formed by said valve member are configured relative thereto such that at said reference position said shaft is substantially centered relative to said valve member.

9. The invention of claim 1 wherein said valve is operable over a substantial range of rotational positions of said valve member to alter torque applied thereon by said fluid.

10. A butterfly valve comprising:
    a duct member defining a flow path for fluid;
    a hollow shaft supported by said duct member and extending across said flow path, said shaft defining a longitudinal axis and being rotatable about said axis;
    a plate-like valve member disposed in said flow path parallel to said shaft, said valve member being rotatable with said shaft from a closed position whereat said valve member spans said flow path to close fluid communication therethrough to open positions whereat said fluid communication is permitted; and
    actuator means disposed in said shaft and connected through said shaft to said valve member for moving said valve member between said closed and open positions said actuator means being operable to effect translational movement of said valve member relative to said longitudinal axis whereby said butterfly valve is operable to alter torque applied by said fluid on said valve member.

11. The invention of claim 10 wherein both said valve member and said shaft are adapted to form cams, and further comprising two cam followers secured to said actuator means and connecting said actuator means to said valve member through said shaft, said cam followers being movable along said cams in response to actuation of said actuator means, whereby said actuator means and said cam followers are cooperable to effect movement of said valve member relative to said longitudinal axis.

12. The invention of claim 11 wherein said movement of said valve member relative to said longitudinal axis comprises revolutionary movement.

13. The invention of claim 10 wherein said movement of said valve member relative to said longitudinal axis comprises revolutionary movement.

14. The invention of claim 13 wherein said actuator means comprises two spaced-apart pistons slidably disposed in and coaxial with said shaft.

15. The invention of claim 14 further comprising biasing means interposed between said pistons for urging said pistons apart, thereby urging said valve member toward said closed position.

* * * * *